INVENTOR
NORMAN J.H. BENNETT

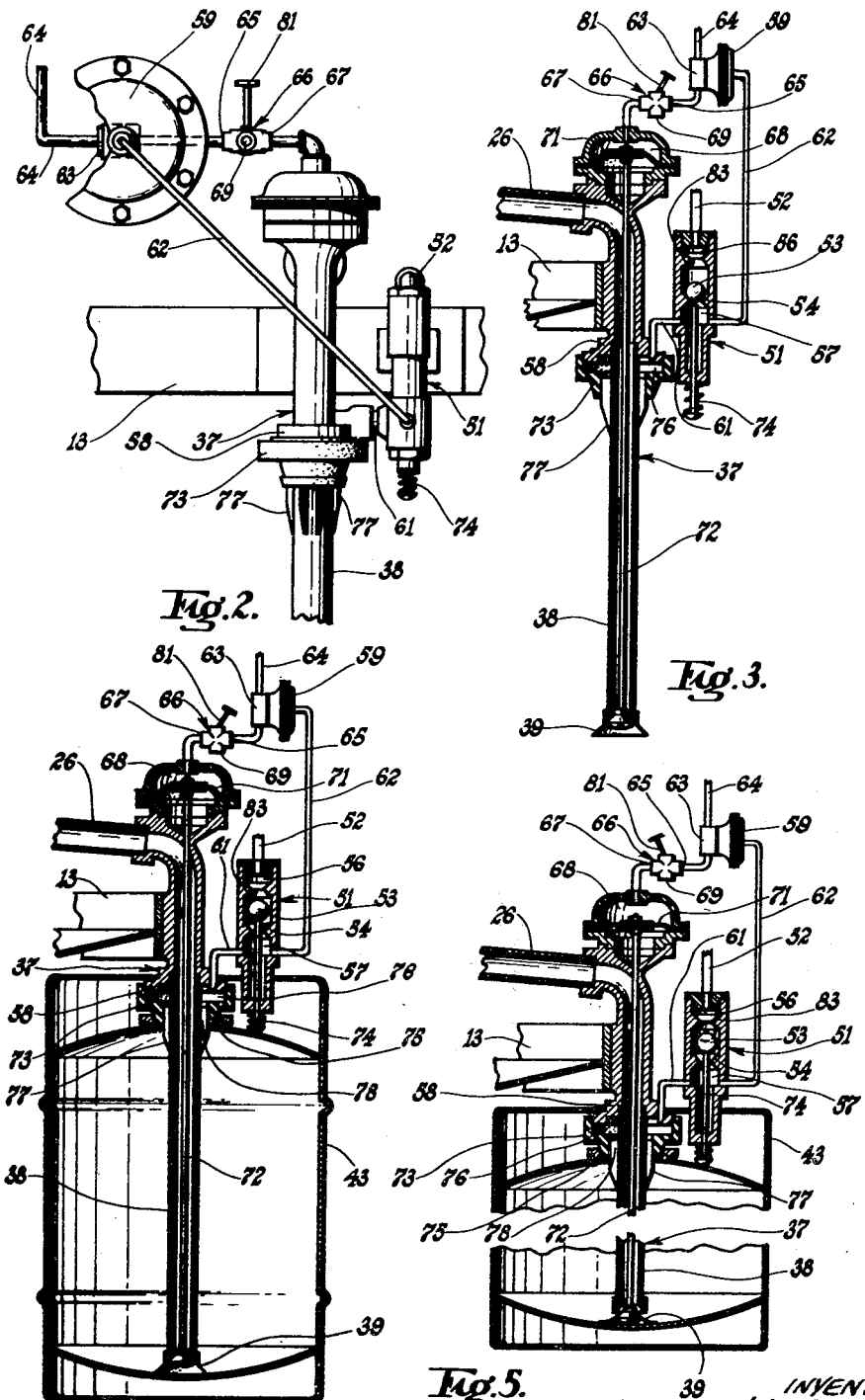

INVENTOR
NORMAN J. H. BENNETT

United States Patent Office 3,043,349
Patented July 10, 1962

3,043,349
APPARATUS FOR FILLING CONTAINERS WITH LIQUID
Norman James Herbert Bennett, North Kew, Victoria, Australia, assignor to Vickers Ruwolt Proprietary Limited, Richmond, Victoria, Australia, a company of Victoria
Filed Dec. 29, 1959, Ser. No. 862,627
5 Claims. (Cl. 141—39)

This invention relates to apparatus for filling containers such as metallic or wooden casks with liquids such as beer, and has for its general object to provide improved rotary turret type apparatus which is automatic in operation and will enable the containers to be filled in a most expeditious manner so that a high rate of output and a substantially continuous or regular delivery of filled containers is ensured.

A more specific object is to incorporate in such apparatus a means or system for controlling the flow of liquid from a distribution tank into the individual containers so that each container will be filled due to the hydrostatic head between the distribution tank and the respective containers as they are brought into the filling position.

The improved apparatus will be found particularly suitable for charging casks with beer, and by way of example it may be mentioned that with apparatus having thirteen filling heads it is possible to fill eighteen-gallon casks with beer at a rate of about four hundred per hour.

The above and other objects, features and advantages of the invention will be readily understood from the following description and accompanying drawings relating to apparatus designed for filling eighteen-gallon casks with beer, but it is to be understood that it may be adapted for use on various size casks or other containers and that they may be filled with liquids other than beer.

A preferred form of the invention will now be described with reference to the accompanying drawings in which:

FIGURE 2 is an enlarged external view of the upper part of a filling spear and associated parts;

FIGURE 3 is a sectional view of a filling spear and associated parts;

FIGURE 4 is a view similar to FIGURE 3, but also showing a cask raised into the filling position around a filling spear;

FIGURE 5 is a view similar to FIGURE 4, but showing a further stage in the filling operation, the cask being vertically contracted for convenience of illustration.

Figure 1:
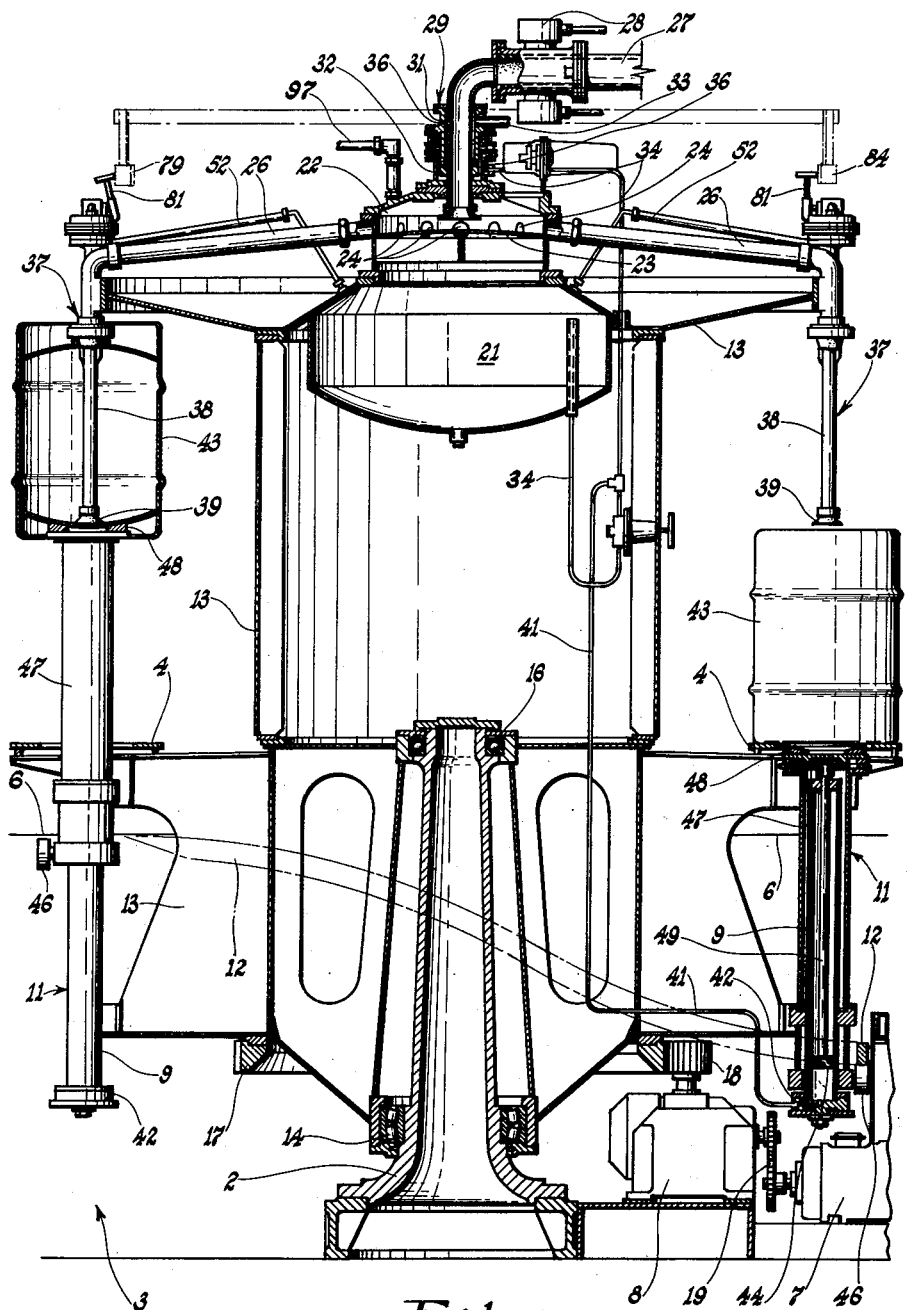
FIGURE 1 is an elevation with some parts shown in section and other parts omitted for convenience of illustration.

Referring more particularly to FIGURE 1, a pedestal 2 may upstand from the base of a pit 3 of such a depth as to enable loading and unloading of the casks onto and from an annular platform 4 by means of suitable conveyors (not shown) at a short distance, say about ten inches, above ground level 6.

A drive motor 7, a gearbox 8, and air cylinders 9 for operating the cask lifts 11, and a cam member 12 for controlling the operation of the cask lifts may also be conveniently located within the pit 3.

The rotary turret or main supporting body 13 of the apparatus may be rotatably mounted upon the pedestal 2 by lower and upper bearings 14 and 16, and rotation of the turret may be effected through toothed wheel 17 at its base meshing with a toothed pinion 18 on the output shaft of gearbox 8. The motor and the gearbox may be connected by a chain or other suitable drive 19.

An air reservoir 21 is mounted on the upper part of the turret 13 and a beer distribution tank 22 is mounted on top of the reservoir 21. A domed plate 23 may form the base of tank 22 and ensure that the beer entering it by way of a supply pipe 27 flows to the outer periphery of the tank 22 and passes through ports 24 to the beer distributing pipes 26 which radiate from the tank. The flow of beer from the main supply may be controlled by a valve 28 interposed in supply pipe 27 which has a vertical portion passing through a gland 29 located above the tank 22. The upper part 31 of gland 29 is stationary, whereas the lower part 32 rotates with the rotary turret 13 and other parts.

The pipes 26 slope downwards from the tank 22 and connect it to a corresponding number of filling spears 37 so that beer can flow into the filling spear cylinders 38 which are normally closed at their lower ends by outlet valves 39.

Air enters the fixed part 31 of the gland 29 from the main air supply line 33, travels through passages 36 provided within the gland, and passes from the rotating part 32 into the pipe 34 which connects with the air reservoir 21. A pipe 41 extends from pipe 34 to the base 42 of the respective air cylinder 9 and the air pressure so provided to the cask lifts 11 normally urge the said lifts upwards.

An arcuate cam 12 is so arranged as to retain the cask lifts 11 in their fully lowered positions (see the right hand side of FIGURE 1) during loading and unloading of the casks, and slopes upwards in both circumferential directions (as indicated by the chain dot lines) so enabling casks to be raised onto, and lowered from, the filling spears 37. For this purpose, a cam follower in the form of a roller 46 engaging the under surface of the cam is connected to an outer cylinder 47 one of which is slidably mounted on the air cylinder 9 of the respective cask lift 11. A cask seat 48 is secured to the top of the outer cylinder 47 while a rod 49 is fixed at its upper end to the seat 48 and at its lower end to a piston 44 located within the air cylinder 9.

With such an arrangement air pressure is always tending to force the piston 44 and consequently the cask seat 48, outer cylinder 47, and roller 46, upwards subject however to the control exercised by the cam 12.

The casks 43 to be filled may be automatically fed by any suitable means at timed intervals onto the circular platform 4 at positions above the cask seats 48 which are held slightly below the top surface of the platform 4 as shown on the right hand side of FIGURE 1 during loading and unloading.

The operations described hereinafter refer to the filling of one cask only, but it is to be understood that a number of casks will be filled simultaneously although the stage reached in filling one cask will be slightly ahead of that of the cask on one side and slightly behind that of the cask on the other side.

The turret 13 will be rotated at some suitable speed and the casks will be advanced onto the platform 4 above the respective cask seats 48 at a suitable rate which may be one per ten seconds.

Prior to a cask 43 being raised into position around its respective filling spear 37, the said spear and certain valves associated therewith will be in the positions shown in FIGURE 3. Thus a ball or float valve 51 mounted on the turret 13 has an upper chamber 56 connected by pipe 52 to the air reservoir 21, so that air entering the upper chamber 56 holds the ball or float 53 down on its lower seat 54. Consequently, the air under pressure is prevented from passing into the lower chamber 57 which is connected by pipe 61 to a boss 58 on the filling spear 37 and by pipe 62 to a diaphragm 59, which latter tends to hold a pilot valve 63 in its closed position. The pilot valve 63 is connected by a pipe 64 with the main supply pipe 34. Under the conditions referred to, air under pressure is prevented from reaching a three-way valve 66 which has one outlet 67 connected to a diaphragm chamber 68 at the top of the filling spear 37 and a second outlet 69 which is open to the atmosphere.

A diaphragm 71 located within the chamber 68 is so formed that its central portion is normally urged upwards and it has a rod 72 connecting its centre with an outlet valve or stopper 39 at the lower end of the filling spear cylinder 38. In the absence of pressure tending to depress the diaphragm 71, the valve 39 is held in the closed position thereby preventing beer from passing out of the cylinder 38.

As the cask is being carried around on the platform 4 from the loading position, the cask lift device 11 becomes operative due to appropriate upward slope of cam 12 so that the cask is lifted off the platform and gradually raised into the position seen at the left hand side of FIGURE 1 and in FIGURES 4 and 5.

When the cask reaches its fully raised position, its neck 75 is sealed about a resilient sleeve 73 attached to the spear boss 58 so that any gas escaping from the beer as it flows into the cask is prevented from leaving the cask, and the sealing also enables the cask interior to be subjected to a predetermined pressure as will be described hereinafter.

As the cask is approaching the fully raised position it lifts the ball 53 of valve 51 from its lower seat 54, as by the upper end of the cask engaging and raising a spring loaded pin 74, as shown in FIGURE 4. Air under pressure from the reservoir 21 entering the upper chamber of the valve 51 by way of pipe 52 is now able to pass to the lower chamber 57 and from thence through pipes 61 and 62 to the spear boss 58 and diaphragm 59, respectively.

Pipe 61 enters the boss 58 and opens into an annular space or chamber 76 formed within the resilient sleeve 73. Radial fins 77 form passages 78 between the outer cylinder 38 and resilient sleeve 73 so that the said annular space 76 is in communication with the interior of the cask 43. Consequently, the air now passing through pipe 61 enters the interior of said cask 43 subjecting it to a pressure equal to that in the air reservoir 21. Such pressure may, for example, be in the region of 10 to 14 p.s.i.

As there is now pressurized air inside the pipe 62, the diaphragm 59 is depressed and causes the pilot valve 63 to open and allow the air under pressure inside pipe 64 to reach valve 66. At this stage valve 66 has both the outlets 67 and 69 open and the inlet 65 closed, with the result that pressurized air is prevented from entering valve 66. The air pressure inside said pipeline 64 may, for example, be 45 to 50 p.s.i.

As rotation of the apparatus continues, a cam or striker 79 (top left hand portion of FIGURE 1), fixed to some stationary part of the apparatus, engages a lever 81 on valve 66 and moves the latter into a position in which outlet 69 is closed and the inlet 65 is opened. This enables air under pressure to pass through the said valve 66 and enter the chamber 68 thereby forcing the diaphragm 71 downwards, with the result that the spear valve 39 is opened, as shown in FIGURE 5. Beer is now able to flow from the distribution tank 22 to the cask 43 via the respective pipe 26 and spear cylinder 38.

When the cask 43 is full, beer rises into the ball valve 51, via passages 78 and pipe 61, and floats the ball 53 onto its upper seat 83, as shown dotted in FIGURE 5.

Just before the cam 12 commences to lower the filled cask another cam or striker 84 (top right hand portion of FIGURE 1) moves valve lever 81 to its original position at which the diaphragm chamber 68 is exhausted to the atmosphere through outlet 67 and 69, whilst inlet 65 is closed. This allows the diaphragm 71 and spear valve 39 to rise thereby sealing off the beer in the spear cylinder 38. As the cask 43 descends and breaks the seal at the neck 65, the ball valve 51 is exhausted to the atmosphere by way of pipe 61 and passages 78, and the ball 53 descends onto the lower seat 54.

As pressurized air is no longer acting on the diaphragm 59, pilot valve 63 automatically closes and cuts off the pipe 64 at that point.

The cask 43 is brought down to the unloading position by means of the cam 12, removed from platform 4 by any suitable means and after it has been closed by a suitable cap is conveyed to a discharge point.

It is desirable that provision by made whereby the casks will be filled at a substantially constant rate, and the said rate may be predetermined to provide a flow of beer such that the said casks are filled to the desired level within the time allowed during each revolution of the apparatus.

Figure 6:
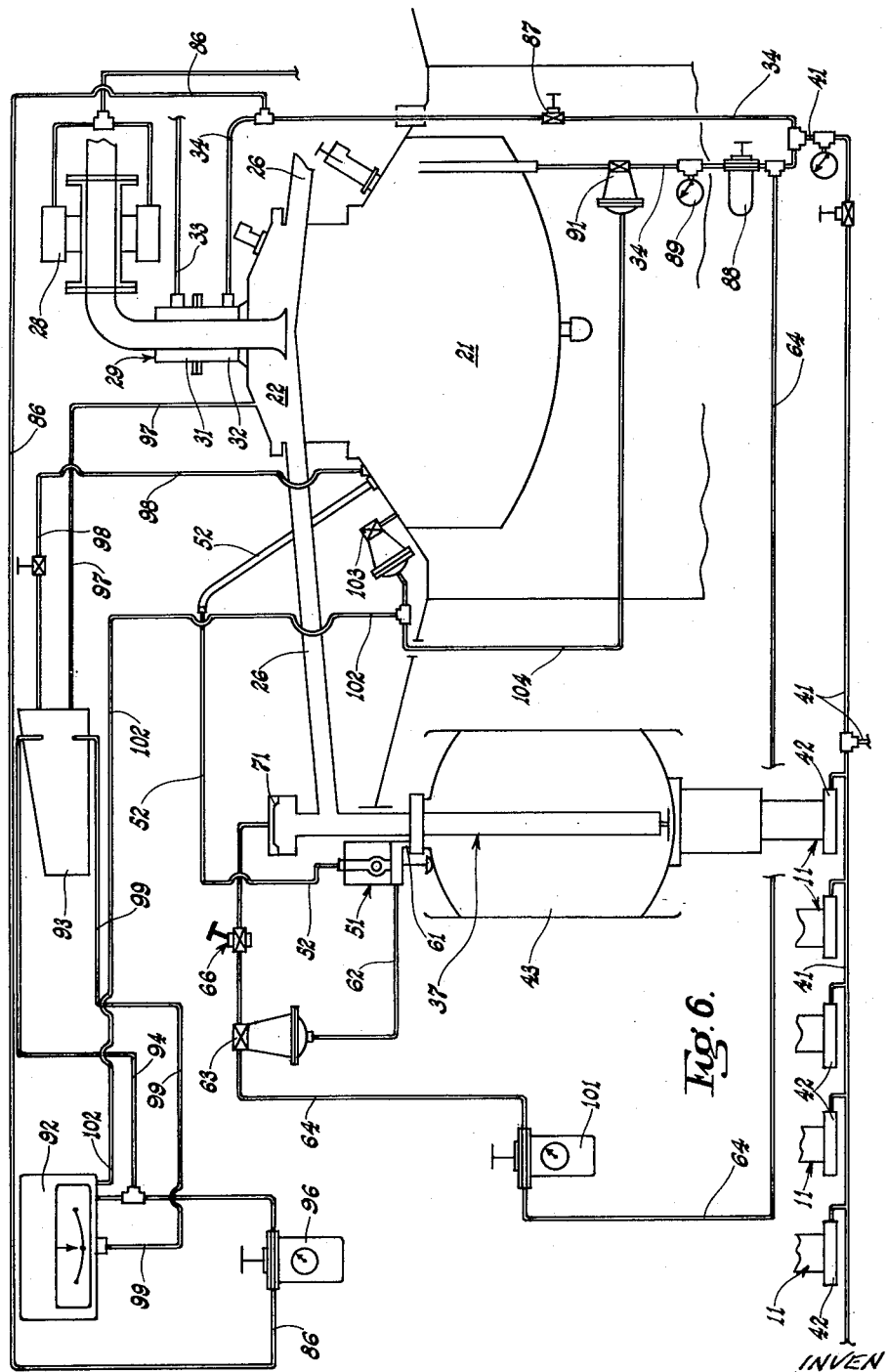
FIGURE 6 is a diagrammatic view of a portion of the apparatus showing certain control devices.

In order to enable the casks to be filled at this predetermined rate and to maintain the air pressure acting on top of the beer in the cask being filled substantially equal to the air pressure above the beer in the distributing tank we prefer to employ a control system as will now be described with reference to FIGURE 6 of the drawings.

Pipelines 33 and 34 provide the main air supply to the system at a pressure of, say 45 to 50 p.s.i Said pipeline 34 passes from the rotary part 32 of beer gland 29 to the air reservoir 21 and has a branch line 86, control valve 87, cask lift distribution pipeline 41, spear diaphragm distribution pipeline 64, pressure reducing valve 88, pressure gauge 89, an air supply valve 91 connected thereto in the sequence given, before the said pipeline 34 enters reservoir 21. Valve 88 is adjusted so that the pressures in th portions of pipeline 34 before and after the said valve 88 are, for example approximately, 50 p.s.i. and 14 p.s.i., respectively.

Branch pipe 86 connects with a pressure controlling instrument 92 of known or suitable form, and a known or suitable form of differential pressure transmitting instrument 93 through a further pipe 94, and an air regulator 96 interposed in pipe 86 prior to the controller 92, ensures that air is supplied at a substantially constant pressure to both the instruments 92 and 93. Pipes 97, 98 and 99 connect the beer distribution tank 22, air reservoir 21, and pressure controller 92, respectively to the pressure transmitter 93, and a further pipe 102 connects the controller 92 with the air reservoir vent valve 103 which is in turn connected by pipe 104 with the supply valve 91. The Fulscope Flow Controller and the Transaire Differential Pressure Transmitter, both products of Taylor Industries Companies, Rochester, New York, have proved successful as the controller 92 and transmitter 93, respectively. The Fulscope Controller has been completely described in U.S. Patent No. 2,361,885, issued to K. L. Tate et al. on October 31, 1944.

The air supply valve 91 and vent valve 103 are the two valves which control the pressure in the air reservoir 21, and both valves are preferably spring loaded as well as being diaphragm controlled. The vent valve 103 is assumed to be closed by air pressure and opened by spring loading, whereas the supply valve 91 is assumed to be opened by air pressure and closed by spring loading.

The spear distribution pipe 64 is provided with an air regulator 101 so that air of substantially constant pressure is supplied to the spear diaphragm 71 through pilot valve 63 and three-way valve 66, respectively.

When a cask 43 reaches the position illustrated in FIGURE 4, air flows from the reservoir 21, through pipe 52, into the cask as previously described, and this flow of air causes a momentary decrease in the air pressure inside reservoir 21. The pressures inside pipes 97 and 98 are now different, and the differential pressure transmitter 93 senses this difference between the beer and air pressure. A pneumatic impulse proportional to this difference is relayed from said transmitter 93, through pipe 99, to the pressure controller 92 which compares the impulse with a set pointer so that a second pneumatic impulse is sent from the said controller 92, through pipes 102 and 104 to the vent valve 103 and supply valve 91, respectively. This second pneumatic impulse causes the vent valve 103 to close partially or completely thereby restricting or preventing further escape of air from the reservoir 21 through this vent, and also permits more air to be admitted through the supply valve 91 with the result that the pressure inside the air reservoir 21 increases to the required value.

When the cask 43 starts to fill, the air pressure inside the cask increases and back pressure occurs along pipeline 52. Consequently, the pressure inside reservoir 21 increases and causes a pressure difference to exist in pipes 97 and 98. This difference is opposite to the one occurring in the previous case, and the pneumatic impulse sent to valves 103 and 91 is much weaker, with the result that valve 103 opens partially or completely to exhaust air from the reservoir 21 and valve 91 closes partially or completely to restrict or prevent the entrance of air to said reservoir 21.

The pressure control is a continuous process and the instruments are capable of maintaining the differential pressure constant to within ±2″ w.g.

I claim:
1. Apparatus of the rotary turret type for filling containers with liquid, comprising a reservoir for containing compressed air and having air inlet and outlet control valves, a liquid distributing tank having a number of outlets spaced around its periphery, a corresponding number of valve controlled filling spears each being connected at its upper end to the outer end of one of said distributing tank outlets and projecting downwardly for entry into one of the containers, a corresponding number of lift devices disposed in vertical alignment beneath the respective filling spears, all of the foregoing being supported by a rotary turret so as to turn therewith, means whereby during each revolution of said turret each container is first raised by its lifting device so as to accomodate the respective filling spear and after being filled is lowered so as to be freed from the spear, a corresponding number of valve controlled pipe connections also turning with said turret and adapted to place said air reservoir into communication with the upper part of a container when the latter is in the raised or filling position, so that liquid entering the container by way of a filling spear is subject to air pressure above atmospheric, a differential pressure transmitting instrument connected to the liquid distributing tank and the air reservoir so as to respond to pressure differences arising between them on the filling of a container, a pressure controlling instrument connected to said differential pressure transmitting instrument and to said air inlet and outlet control valves of the reservoir for measuring any pressure difference sensed by said transmitting instrument and in accordance with the magnitude of said pressure difference actuating the air inlet or outlet valves of the reservoir, whereby the air pressure above the liquid in the container is kept substantially equal to the air pressure above the liquid in the distributing tank.

2. Apparatus to claim 1, wherein each filling spear is in the form of a tube provided at its top with a chamber containing a diaphragm having secured thereto a rod which passes freely down the tube and is provided at its bottom with an outlet valve for controlling the admission of liquid into a container to be filled, the filling spear having intermediate its height a resilient sleeve adapted to make an air tight connection with an inlet neck at the top of the container and to form an annular chamber communicating with the interior of the container, a first valve adapted upon raising of the container into its filling position to admit air from said reservoir via said annular chamber and said passage into the interior of the container, and also to open a pilot valve which permits air, at a pressure higher than that obtaining in said reservoir, to pass to a three-way valve controlling the admission of the high pressure air to said diaphragm chamber, means being provided for automatically actuating said three-way valve at a predetermined stage during rotation of the apparatus in order to admit the high pressure air to said diaphragm chamber so that the diaphragm will be deformed and cause the outlet valve at the bottom of the filling spear to be opened and thus allow liquid to fill the container.

3. Apparatus according to claim 2 wherein the means for actuating said three-way valve include a lever on the valve and two strikers adapted to engage said lever during different stages of rotation of the apparatus, whereby the valve is automatically opened to admit the high pressure air in said diaphragm chamber while the container is in the filling position and is automatically opened to atmosphere at the completion of filling so as to permit the diaphragm chamber to be exhausted and thus cause the filling spear valve to be closed.

4. Apparatus according to claim 1 wherein said differential pressure transmitting instrument has pipe connections with the air reservoir and the upper part of the liquid distributing tank, said pressure controlling instrument has pipe connections with said transmitting instrument and a pipe for conducting air, at a pressure higher than that obtaining in said reservoir, to said controlling instrument, said transmitting instrument sensing any difference occurring between the air pressures obtaining in the reservoir and the liquid distributing tank and transmitting a pneumatic impulse proportional to such differences to said controlling instrument which, after comparing such impulse with a set pointer of the instrument, relays a second pneumatic impulse to said air reservoir inlet and outlet valves so that, in the event of pressure in the distributing tank being greater than that in the reservoir, the outlet valve will be closed partially or completely so as to restrict or prevent escape of air from the reservoir and the inlet valve will be opened to a greater extent, while in the event of pressure in the distributing tank being less than that in the reservoir the outlet valve will be opened to allow escape of air and the inlet valve will be closed wholly or partially, until equilibrium of pressure is restored.

5. Apparatus according to claim 4 wherein said air inlet valve is resiliently urged towards the closed position and adapted to be moved towards the open position by said second impulse and wherein said outlet valve is resiliently urged towards the open position and adapted to be moved towards the closed position by said second impulse.

References Cited in the file of this patent
UNITED STATES PATENTS

| | | |
|---|---|---|
| 1,881,783 | Mallinckrodt et al. | Oct. 11, 1932 |
| 2,060,276 | Bondurant | Nov. 10, 1936 |
| 2,202,033 | Stewart et al. | May 28, 1940 |
| 2,810,406 | De Milleville | Oct. 22, 1957 |
| 2,824,584 | Breeback | Feb. 25, 1958 |